(12) United States Patent
Croome

(10) Patent No.: US 7,440,774 B2
(45) Date of Patent: *Oct. 21, 2008

(54) WIRELESS ENABLED MEMORY MODULE

(75) Inventor: Martin Croome, Brié et Angonnes (FR)

(73) Assignee: Socket Mobile, Inc., Newark, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/510,651

(22) PCT Filed: Apr. 8, 2003

(86) PCT No.: PCT/US03/10532

§ 371 (c)(1),
(2), (4) Date: Oct. 8, 2004

(87) PCT Pub. No.: WO03/088021

PCT Pub. Date: Oct. 23, 2003

(65) Prior Publication Data

US 2006/0056326 A1 Mar. 16, 2006

Related U.S. Application Data

(60) Provisional application No. 60/390,019, filed on Jun. 19, 2002, provisional application No. 60/370,682, filed on Apr. 8, 2002.

(51) Int. Cl.
H04M 1/00 (2006.01)
H04M 11/00 (2006.01)
H04B 1/38 (2006.01)
H04B 7/00 (2006.01)

(52) U.S. Cl. ............... 455/557; 455/558; 455/41.2; 455/403; 455/550.1; 455/551; 455/556.2

(58) Field of Classification Search ............ 455/550.1, 455/3.01, 3.03–3.06, 41.2–41.3, 66.1, 88, 455/344, 346–349, 351–352, 403, 410, 418–420, 455/426.2, 434, 462, 465, 500, 507, 508, 455/514, 557–558, 556.1–556.2, 561; 348/211.2–211.3; 709/203, 209, 216; 370/285, 293, 310, 315, 370/328, 338, 363, 368, 371, 374, 378, 381–385

See application file for complete search history.

(56) References Cited

U.S. PATENT DOCUMENTS 4,455,620 A 6/1984 Watanabe et al.

(Continued)

FOREIGN PATENT DOCUMENTS

EP 0657834 A1 6/1995

(Continued)

OTHER PUBLICATIONS

Wes Brewer, Smart Solutions for Smart Phones, SanDisk Corporation, 1998.

(Continued)

Primary Examiner—Meless N Zewdu
(74) Attorney, Agent, or Firm—PatentVentures; Bennett Smith; Korbin Van Dyke

(57) ABSTRACT

A wireless-enabled memory module provides host devices access to a memory via a standard memory expansion interface and further incorporates embedded processing capability and a wireless network capability. The wireless-enabled memory module can be used in any host device providing a compatible memory card controller and interface. Host devices so equipped become wireless-memory enabled devices and can provide memory access to any other remote device enabled for compatible wireless communications. It is thereby possible for a remote device to access the memory content of the memory module, and cause transfers of either full-size or scaled versions of the content to the remote device through a first network, and optionally further transfer the content from the remote device through a second network to the Internet in the form of an e-mail message or MMS attachment.

33 Claims, 4 Drawing Sheets

U.S. PATENT DOCUMENTS

| | | |
|---|---|---|
| 4,458,313 A | 7/1984 | Suzuki et al. |
| 4,614,144 A | 9/1986 | Sagara et al. |
| 4,744,006 A | 5/1988 | Duffield |
| 4,882,473 A | 11/1989 | Bergeron et al. |
| 4,882,476 A | 11/1989 | White |
| 5,049,728 A | 9/1991 | Rovin |
| 5,067,075 A | 11/1991 | Sugano et al. |
| 5,155,663 A | 10/1992 | Harase |
| 5,184,282 A | 2/1993 | Kaneda et al. |
| 5,291,584 A | 3/1994 | Challa et al. |
| 5,320,552 A | 6/1994 | Reichardt et al. |
| 5,375,037 A | 12/1994 | Le Roux |
| 5,375,084 A | 12/1994 | Begun et al. |
| 5,434,872 A | 7/1995 | Petersen et al. |
| 5,438,359 A | 8/1995 | Aoki |
| 5,457,601 A | 10/1995 | Georgopulos et al. |
| 5,486,687 A | 1/1996 | Le Roux |
| 5,491,774 A | 2/1996 | Norris et al. |
| 5,513,074 A | 4/1996 | Ainsbury et al. |
| 5,519,577 A | 5/1996 | Dudas et al. |
| 5,545,057 A | 8/1996 | Tan et al. |
| 5,550,709 A | 8/1996 | Iwasaki |
| 5,563,400 A | 10/1996 | Le Roux |
| 5,566,290 A | 10/1996 | Silverbrook |
| 5,579,430 A | 11/1996 | Grill et al. |
| 5,594,873 A | 1/1997 | Garrett |
| 5,606,559 A | 2/1997 | Badger et al. |
| 5,611,055 A | 3/1997 | Krishan et al. |
| 5,611,057 A | 3/1997 | Pencone et al. |
| 5,615,344 A | 3/1997 | Corder |
| 5,619,396 A | 4/1997 | Gee et al. |
| 5,655,917 A | 8/1997 | Kaneshige et al. |
| 5,661,635 A | 8/1997 | Huffman et al. |
| 5,663,901 A | 9/1997 | Wallace et al. |
| 5,671,374 A | 9/1997 | Postman et al. |
| 5,675,734 A | 10/1997 | Hair |
| 5,677,524 A | 10/1997 | Haghiri-Tehrani |
| 5,679,007 A | 10/1997 | Potdevin et al. |
| 5,727,168 A | 3/1998 | Inoue et al. |
| 5,733,800 A | 3/1998 | Moden |
| 5,742,910 A | 4/1998 | Gallant et al. |
| 5,752,857 A | 5/1998 | Knights |
| 5,764,896 A | 6/1998 | Johnson |
| 5,765,027 A | 6/1998 | Wang |
| 5,778,195 A | 7/1998 | Gochi |
| 5,780,837 A | 7/1998 | Garcia |
| 5,780,925 A | 7/1998 | Cipolla et al. |
| 5,784,259 A | 7/1998 | Asakura |
| 5,784,633 A | 7/1998 | Petty |
| 5,802,325 A | 9/1998 | Le Roux |
| 5,805,083 A | 9/1998 | Sutton et al. |
| 5,809,520 A | 9/1998 | Edwards et al. |
| 5,818,030 A | 10/1998 | Reyes |
| 5,822,190 A | 10/1998 | Iwasaki |
| 5,831,256 A | 11/1998 | De Larminat et al. |
| 5,831,533 A | 11/1998 | Kanno |
| 5,837,984 A | 11/1998 | Bleier et al. |
| 5,839,108 A | 11/1998 | Dabedko et al. |
| 5,848,373 A | 12/1998 | DeLorme et al. |
| 5,852,290 A | 12/1998 | Chaney |
| 5,876,218 A | 3/1999 | Liebenow |
| 5,877,488 A | 3/1999 | Klatt et al. |
| 5,887,145 A | 3/1999 | Harai et al. |
| 5,890,016 A | 3/1999 | Tso |
| 5,892,213 A | 4/1999 | Ito et al. |
| 5,906,516 A | 5/1999 | Sato et al. |
| 5,909,596 A | 6/1999 | Mizuta |
| 5,928,347 A | 7/1999 | Jones |
| 5,933,328 A | 8/1999 | Wallace et al. |
| 5,971,280 A | 10/1999 | Hoolhorst |
| 5,974,496 A | 10/1999 | Miller |
| 5,975,584 A | 11/1999 | Vogt |
| 5,986,891 A | 11/1999 | Sugimoto |
| 5,987,557 A | 11/1999 | Ebrahim |
| 6,002,605 A | 12/1999 | Iwasaki et al. |
| 6,040,622 A | 3/2000 | Wallace |
| 6,053,748 A | 4/2000 | Bricaud et al. |
| 6,062,480 A | 5/2000 | Evoy |
| 6,062,887 A | 5/2000 | Schuster et al. |
| 6,069,795 A | 5/2000 | Klatt et al. |
| 6,075,706 A | 6/2000 | Learmonth et al. |
| 6,085,412 A | 7/2000 | Iwasaki |
| 6,091,137 A | 7/2000 | Fukuda |
| 6,097,605 A | 8/2000 | Klatt et al. |
| 6,102,714 A | 8/2000 | Oliphant et al. |
| 6,125,409 A | 9/2000 | Le Roux |
| 6,137,710 A | 10/2000 | Iwasaki et al. |
| 6,140,695 A | 10/2000 | Tandy |
| 6,145,046 A | 11/2000 | Jones |
| 6,151,511 A | 11/2000 | Cruciani |
| 6,151,652 A | 11/2000 | Kondo et al. |
| 6,175,517 B1 | 1/2001 | Jigour et al. |
| 6,199,756 B1 | 3/2001 | Kondo et al. |
| 6,202,109 B1 | 3/2001 | Salo et al. |
| 6,209,790 B1 | 4/2001 | Houdeau et al. |
| 6,222,726 B1 | 4/2001 | Cha |
| 6,226,202 B1 | 5/2001 | Kikuchi |
| 6,240,301 B1 | 5/2001 | Phillips |
| 6,244,894 B1 | 6/2001 | Miyashita |
| 6,266,724 B1 | 7/2001 | Harari et al. |
| 6,276,943 B1 | 8/2001 | Boutros et al. |
| 6,279,114 B1 | 8/2001 | Toombs et al. |
| 6,293,464 B1 | 9/2001 | Smalley, Jr. |
| 6,311,296 B1 | 10/2001 | Congdon |
| 6,353,870 B1 | 3/2002 | Mills et al. |
| 6,381,662 B1 | 4/2002 | Harari et al. |
| 6,385,677 B1 | 5/2002 | Yao |
| 6,405,278 B1 | 6/2002 | Liepe |
| 6,408,352 B1 | 6/2002 | Hosaka et al. |
| 6,421,246 B1 | 7/2002 | Schremmer |
| 6,434,648 B1 | 8/2002 | Assour et al. |
| 6,438,638 B1 | 8/2002 | Jones et al. |
| 6,446,177 B1 | 9/2002 | Tanaka et al. |
| 6,457,647 B1 | 10/2002 | Kurihashi et al. |
| 6,496,381 B1 | 12/2002 | Groeger |
| 6,499,016 B1 | 12/2002 | Anderson |
| 6,524,137 B1 | 2/2003 | Liu et al. |
| 6,599,147 B1 | 7/2003 | Mills et al. |
| 6,612,498 B1 | 9/2003 | Lipponen et al. |
| 6,651,131 B1 | 11/2003 | Chong, Jr. et al. |
| 6,665,190 B2 | 12/2003 | Clayton et al. |
| 6,669,487 B1 | 12/2003 | Nishizawa et al. |
| 6,676,420 B1 | 1/2004 | Liu et al. |
| 6,687,778 B2 | 2/2004 | Ito et al. |
| 6,691,196 B2 | 2/2004 | Mills et al. |
| 6,721,819 B2 | 4/2004 | Estakhri et al. |
| 6,745,247 B1 | 6/2004 | Kawan et al. |
| 6,748,457 B2 | 6/2004 | Fallon et al. |
| 6,764,017 B2 | 7/2004 | Chen et al. |
| 6,816,933 B1 | 11/2004 | Andreas |
| 6,832,281 B2 | 12/2004 | Jones et al. |
| 6,842,652 B2 | 1/2005 | Yeung |
| 6,842,818 B2 | 1/2005 | Okamoto et al. |
| 6,845,421 B2 | 1/2005 | Hwang et al. |
| 6,862,604 B2 | 3/2005 | Spencer et al. |
| 6,863,557 B2 | 3/2005 | Mills et al. |
| 6,886,083 B2 | 4/2005 | Murakami |
| 6,920,517 B2 | 7/2005 | Mills et al. |
| 6,945,461 B1 | 9/2005 | Hien et al. |
| 6,976,111 B1 * | 12/2005 | Mills et al. ............... 710/301 |
| 6,987,854 B2 | 1/2006 | Maillard |
| 7,017,162 B2 | 3/2006 | Smith et al. |
| 7,107,378 B1 | 9/2006 | Brewer |
| 7,194,565 B2 | 3/2007 | Mills et al. |

| | | | |
|---|---|---|---|
| 7,343,439 B2 | 3/2008 | Mills et al. | |
| 2001/0001507 A1 | 5/2001 | Fukuda et al. | |
| 2001/0021956 A1 | 9/2001 | Okamoto et al. | |
| 2001/0022621 A1 | 9/2001 | Squibbs | |
| 2001/0032335 A1 | 10/2001 | Jones | |
| 2001/0042149 A1 | 11/2001 | Ito et al. | |
| 2002/0032059 A1 | 3/2002 | Sugimura | |
| 2002/0082048 A1* | 6/2002 | Toyoshima | 455/557 |
| 2002/0103988 A1 | 8/2002 | Dornier | |
| 2002/0128875 A1 | 9/2002 | Parry | |
| 2002/0154543 A1 | 10/2002 | Conley et al. | |
| 2003/0018852 A1 | 1/2003 | McLinn | |
| 2003/0056050 A1 | 3/2003 | Moro | |
| 2003/0074529 A1 | 4/2003 | Crohas | |
| 2003/0084221 A1 | 5/2003 | Jones | |
| 2003/0128272 A1 | 7/2003 | Clough et al. | |
| 2003/0144029 A1* | 7/2003 | Wu et al. | 455/557 |
| 2003/0163623 A1 | 8/2003 | Yeung | |
| 2004/0103234 A1 | 5/2004 | Zer et al. | |
| 2004/0196375 A1 | 10/2004 | Marshall | |
| 2004/0201745 A1 | 10/2004 | Wess et al. | |
| 2004/0266480 A1* | 12/2004 | Hjelt et al. | 455/558 |
| 2005/0107987 A1 | 5/2005 | Barr et al. | |
| 2005/0130728 A1* | 6/2005 | Nguyen et al. | 463/16 |
| 2006/0164891 A1 | 7/2006 | Mills et al. | |
| 2007/0073937 A1 | 3/2007 | Feinberg et al. | |

FOREIGN PATENT DOCUMENTS

| | | |
|---|---|---|
| EP | 0891047 A2 | 1/1999 |
| EP | 1001348 A2 | 5/2000 |
| EP | 1404105 | 3/2004 |
| EP | 1465420 | 10/2004 |
| GB | 2365182 | 2/2004 |
| WO | WO 00/49731 | 8/2000 |
| WO | 0067128 A1 | 11/2000 |
| WO | WO 00/68770 | 11/2000 |
| WO | WO 01/45388 | 6/2001 |
| WO | 0219266 A2 | 3/2002 |
| WO | WO 02/19266 | 3/2002 |
| WO | 2003088021 A3 | 10/2003 |
| WO | WO 07/35275 | 3/2007 |

OTHER PUBLICATIONS

CompactFlash Specification Revision 1.3, CompactFlash Association, 1998.

PC Cards and CompactFlash Size CF+ Cards for Ethernet, Serial Communications, Bar Code Scanning and Data Collection, Socket Communications, Inc., 1998.

SanDisk MultiMediaCard, SanDisk Corporation, Nov. 1997.

Apr. 30, 2001 PCT Written Opinion for related International application No. PCT/US00/12796, filed May 9, 2000.

Apr. 24, 2003 UK Examination Report (case subsequently patented as GB 2365182 B, above).

Burris, D.; Cargile, F.M.; Dalton, A.; "A virtual interface bus for portable PCs", (abstract only), Publication Date: 1999.

Ikeda, H.; "Single shot Fastbus sequencer", (abstract only), Publication Date: Oct. 1989.

Excel spreadsheet of Apr. 28, 2008 identifying references used to reject claims in related applications.

ISR for International Application No. EP 03 71 7001.6; completed Nov. 13, 2007, mailed Nov. 26, 2007.

* cited by examiner

WIRELESS ENABLED MEMORY MODULE

SUMMARY

A wireless-enabled memory module (WEMM) in accordance with the invention provides devices access to a memory via a standard memory interface and further incorporates embedded processing capability and a wireless network capability. This card can be used in any host device providing a compatible memory card controller and interface. Host devices equipped with a WEMM become wireless-memory enabled devices (WMED). WEMMs and WMEDs can communicate with any other remote device enabled for compatible wireless communications. Remote devices so enabled are referred to herein as Remote Wireless-enabled Devices (RWED).

The wireless network capability and embedded processing of the WEMM provides RWEDs (such as a mobile phone, PDA, or PC) read and write access to the contents of the memory in the WEMM via a wireless connection, such as a BlueTooth connection in an illustrative embodiment. As an implementation option, the memory of the WEMM may be embedded, may be a removable flash memory card, or both.

The RWED can use this wireless access provided by the WEMM to perform selective data transfers between the WEMM's memory and internal storage within the RWED. Additionally, by e-mail or MMS attachments sent via an additional network, the RWED may act as an intermediary to transfer data (in either direction) between the WEMM's memory and the Internet. For example, a BlueTooth-enabled mobile phone user could access a WEMM that is inserted in a digital camera host. The user could send a friend one or more photos as an e-mail message. The e-mail would result in the transfer of some or all of the stored images from the camera host over the BlueTooth connection to the remote mobile phone, and then to the Internet via the mobile phone network. Similarly, received attachments may be stored to the WEMM.

As a further implementation option, the embedded processing on the WEMM may include a media-scaling engine that can scale the contents to different sizes before transmission over the wireless connection. This enables the user to browse the memory contents in thumbnail form quickly and easily from the remote device. It also permits the user to retrieve a version of the selected content that has been scaled appropriately for the bandwidth capabilities of the BlueTooth connection or mobile network. In a preferred embodiment, the media-scaling engine is implemented using signal processing hardware. However, some or all of its functionality may be also implemented via firmware in the processor subsystem.

DETAILED DESCRIPTION

Figure 1:
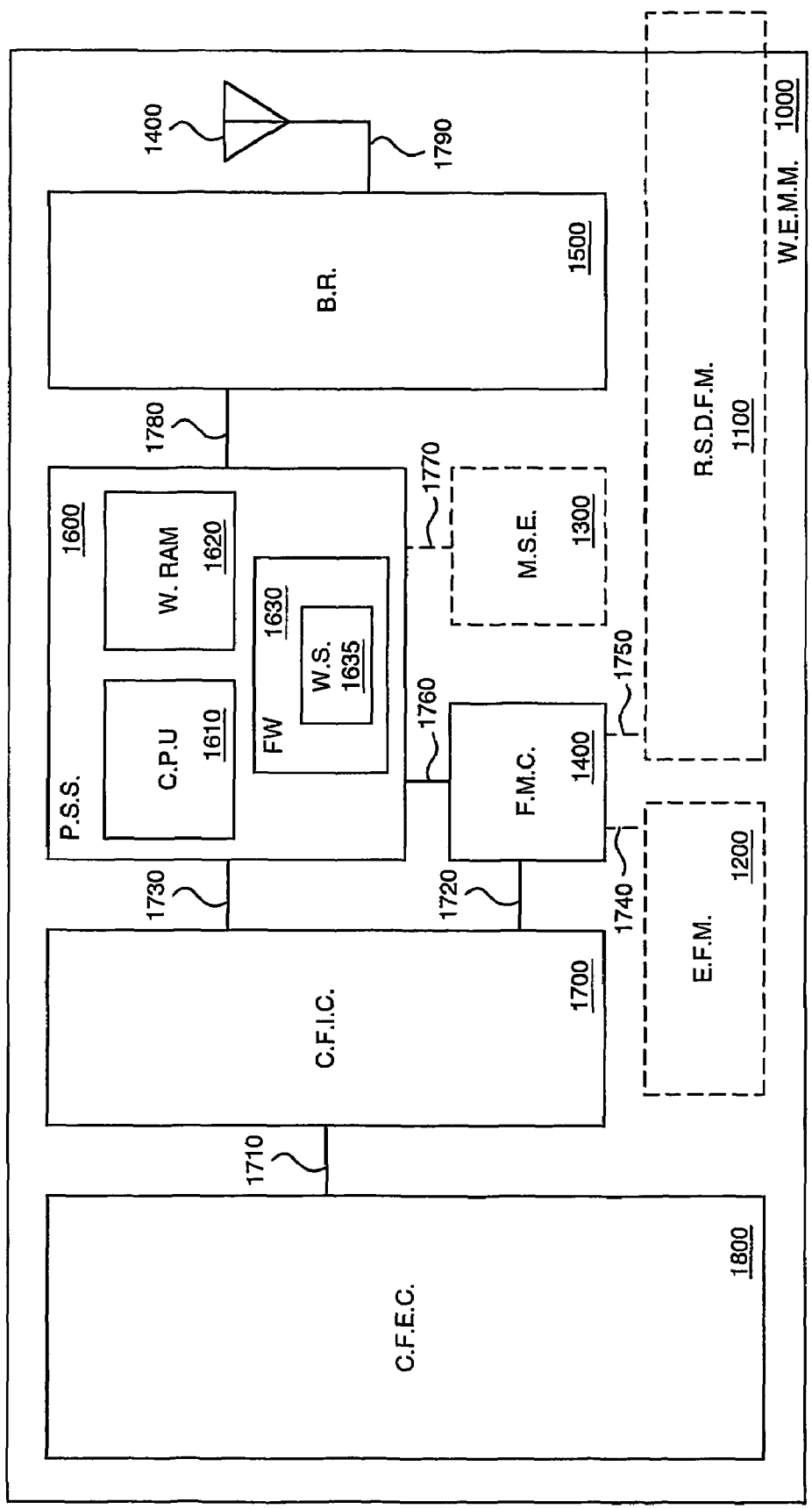
FIG. 1 is a block diagram of a wireless-enabled memory module (WEMM) 1000, physically and electrically compatible with the Compact Flash expansion module standard, and in accordance with the present invention.

Table 1 identifies and expands the abbreviations used in FIG. 1.

TABLE 1

| Associated ID No. | Abbreviation(s) | Expanded Name |
| --- | --- | --- |
| 1000 | W.E.M.M. | Wireless Enabled Memory Module |
| 1100 | R.S.D.F.M. | Removable Secure Digital Flash Memory |
| 1200 | E.F.M. | Embedded Flash Memory |
| 1300 | M.S.E. | Media Scaling Engine |
| 1400 | F.M.C. | Flash Memory Controller |
| 1500 | B.R. | Bluetooth Radio |
| 1600 | P.S.S. | Processor Sub-System |
| 1610 | C.P.U. | Processor |
| 1620 | W.RAM | Working RAM |
| 1630 | FW | Firmware |
| 1635 | W.S. | Web Server |
| 1700 | C.F.I.C | CompactFlash Interface Controller |
| 1800 | C.F.E.C. | CompactFlash Expansion Connector |

In the illustrative embodiment of FIG. 1, the WEMM 1000 and interface (1700, 1710, and 1800) to the host are compatible with the Compact Flash industry standard. The WEMM's memory includes both embedded flash memory 1200 and removable flash memory 1100 compatible with the Secure Digital (SD) industry standard. The wireless network is a Wireless Personal Area Network (WPAN) compatible with the Bluetooth industry standard.

As will be appreciated by those skilled in the art, the specifics of each implementation will dictate the particular requirements of the wireless interface. In an illustrative embodiment intended primarily for use with mobile phones, a low-speed, low-cost, Bluetooth interface 1500 is used. In another illustrative embodiment intended primarily for use with computing devices, such as PCs, a higher-speed, higher-cost, Bluetooth interface is used. The higher speed interface will reduce the time required to transfer a given file and will make the transfer of larger multimedia objects (e.g. higher resolution images and higher quality music) more practical. It will be appreciated by those skilled in the art that the baseband functions of the radio may be stored in the WEMM's integral firmware and performed via the WEMM's integral processor.

Note that the WEMM 1000 constitutes a first-level removable module and the removable flash memory 1100 constitutes a second-level removable module. It will be appreciated by those skilled in the art that there are a number of choices for each of these miniature-form-factor standard interfaces. Thus the WEMM 1000 is not restricted to the CF standard, and the removable flash memory 1100 is not restricted to the SD standard.

A first system application of the WEMM is the wireless transfer of digital photos between a camera and a mobile phone, for associated transfer via the mobile phone network. There is a large installed base of digital cameras that use standard removable memory cards, but do not have I/O expandability or wireless network functionality. These cameras can be augmented with a wireless-enabled memory module, in accordance with the present invention, to send photos via a mobile phone or any other compatibly enabled wireless communications device.

Figure 2:
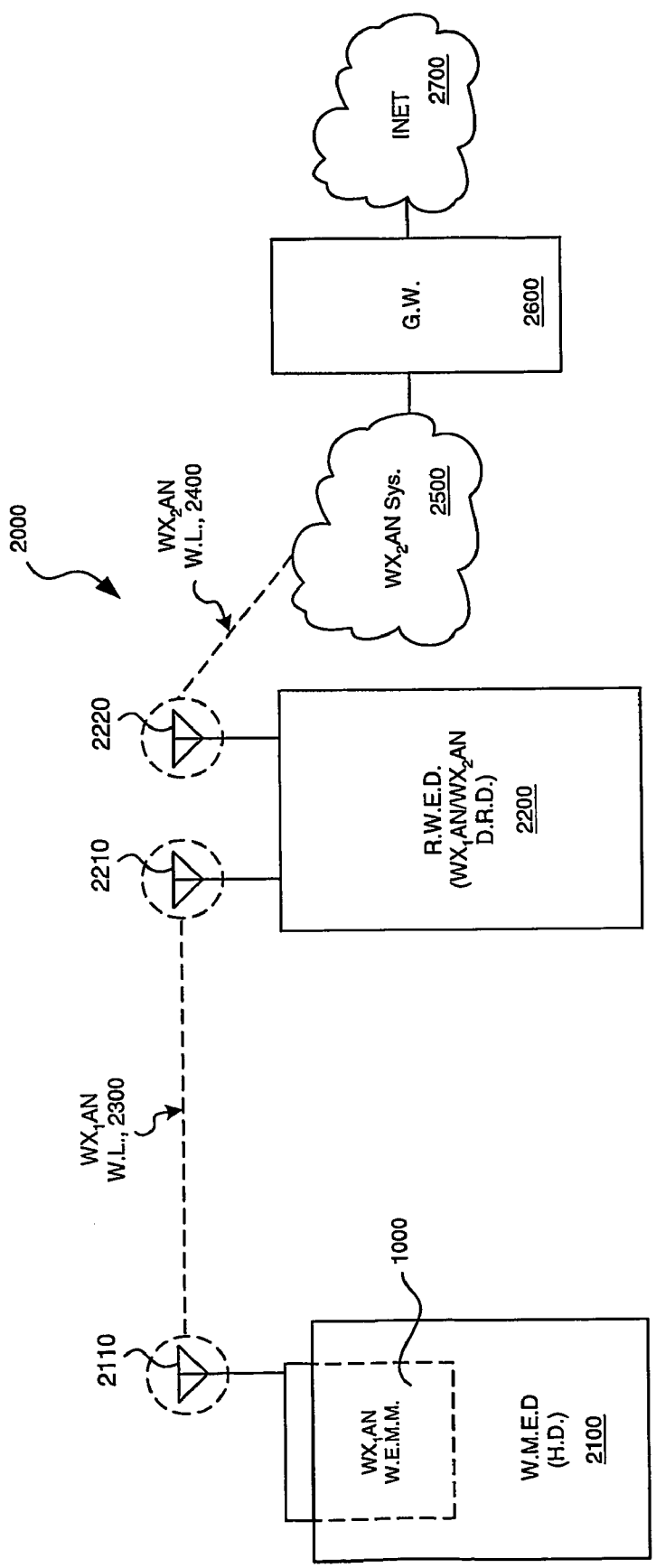
FIG. 2 is a diagram of a system 2000, in accordance with the present invention, illustrating how data on a host device 2100 equipped with a WEMM 1000 may be transmitted over a variety of networks (including 2300, 2500, and 2700).

Table 2 identifies and expands the abbreviations used in FIG. 2.

TABLE 2

| Associated ID No. | Abbreviation(s) | Expanded Name |
| --- | --- | --- |
| 2000 | (none) | (none) |
| 2100 | W.M.E.D. (H.D.) | Wireless Memory Enabled Device (Host Device) |
| 2200 | R.W.E.D. (WX$_1$AN/ WX$_2$AN D.R.D.) | Remote Wireless Enabled Device (WX$_1$AN/WX$_2$AN Dual Remote Device) |
| 2300 | WX$_1$AN W.L. | WX$_1$AN Link |
| 2400 | WX$_2$AN W.L. | WX$_2$AN Link |
| 2500 | WX$_2$AN SYS | WX$_2$AN System |
| 2600 | G.W. | Gateway |
| 2700 | INET | Internet |

A general application for the invention is the illustrative system 2000 of FIG. 2. FIG. 2 illustrates a host device having no native integral wireless capability (such as a camera or a portable audio device) into which a WEMM 1000 is inserted. The resulting combination being a WMED 2100 as previously defined. A WMED communicates with an RWED (e.g. mobile phone) having at least one wireless interface. In FIG. 2, the WMED 2100 communicates with the RWED 2200 over a WX$_1$AN 2300 (a wireless area network of a first type), such as the BlueTooth Wireless Personal Area Network (WPAN) standard. To illustrate a more general system, the RWED 2200 of FIG. 2 is a Dual WX$_1$AN/WX$_2$AN device (i.e., it has two wireless interfaces), such as a mobile phone or wireless-enabled PDA.

In many applications, the WMED 2100 and its associated user interface will be unaware of the capabilities of the WEMM 1000 and offer no means to control it. In an illustrative embodiment, the WX$_1$AN 2300 connection enables the RWED 2200 to access the content within the memory of the WEMM 1000 through a browser-server relationship. The server functionality 1635, which has an associated implementation of the WAP-over-BlueTooth protocol, is stored in the WEMM's integral firmware 1630 and is performed via the WEMM's integral processor 1610. (WAP is the Wireless Application Protocol.)

Thus the user interface to the WEMM 1000 is accomplished via an embedded WAP/Web server 1635 within the WEMM 1000 communicating with a WAP browser on the RWED 2200. The RWED browser-based interface allows the user to:

Browse the contents of the memory (as discussed below, either/both of 1100 or/and 1200) in the WEMM, viewing thumbnail size versions created by an embedded media scaling engine 1300;

Send a multimedia object (e.g., a photograph), optionally scaled to one of a number of sizes via the scaling engine, as an MMS (Multimedia Message Service, a multimedia extension of SMS) or email attachment via a cell phone; and Load a received attachment into the WEMM for storage or for use (e.g., viewing on a camera).

In an alternate embodiment, the user interface makes use of the knowledge of the memory controller of the last file written to allow short cuts, such as "send the last photograph taken".

In an alternate embodiment, the remote device implements a custom user interface created with the SmartPhone2002 or J2ME Java engines instead of the generic WAP browser.

The Dual WX$_1$AN/WX$_2$AN RWED 2200 is in turn connected to a WX$_2$AN system 2500 (a wireless area network of a second type), such as the GSM Wireless Wide Area Network (WWAN) standard, which in turn connects through a Gateway 2600 to the Internet 2700. The RWED 2200 can then retrieve content from the memory (either/both of 1100 or/and 1200) in the WEMM 1000 via the WX$_1$AN 2300 and send it (for example in e-mail or MMS form) via the WX$_2$AN 2500 through a Gateway 2600 to the Internet 2700.

To accommodate the lower-speed interfaces that may be employed, either between the WEMM 1000 and the remote device 2200, or between the remote device 2200 and its WXAN 2500, the WEMM additionally includes processing functionality to scale the size of an individual media item that is sent to the remote device. When the user wishes to browse the content of the memory in the WEMM from the remote device, the WEMM 1000 would send "thumbnail" scaled versions through the BlueTooth connection 2300, for quick browsing. When a media item is selected, it can be sent to the remote device 2200 in one of a number of larger scaling levels, depending on the wireless bandwidths involved.

In an illustrative embodiment using a low-speed Bluetooth interface, camera owners will be able to send postcard versions of snapshots via a mobile phone, using cameras that do not have integral wireless network capability. The invention thus will enable and expand the market for sending and receiving snapshots over wireless networks.

In an illustrative embodiment using a high-speed Bluetooth interface, large high-resolution files may be transferred between a camera equipped with the wireless-enabled memory module and a PC. The invention thus will enable and expand the market for PC-based digital photography, including storage, backup, and archiving of digital photographs.

Other system applications of the wireless-enabled memory module enable other devices to communicate via a mobile phone or to computing devices such as PCs. An example is transfer of MP3 files between an MP3 player and a mobile phone, for associated transfer via the mobile phone network, by equipping the MP3 player with a wireless-enabled memory module having a low-speed Bluetooth implementation. Another example is transfer of large music files between an audio device (e.g. a home entertainment system) and a PC, by equipping the audio device with a wireless-enabled memory module having a high-speed Bluetooth implementation.

As an implementation option, the memory capability of the WEMM 1000 is implemented using an embedded fixed size memory 1200, a removable memory 1100 (for example a removable SD memory device), or both. In an illustrative embodiment, the removable memory is a second-level module and the wireless-enabled memory module is a first-level module, such as those disclosed by U.S. Pat. No. 6,353,870, CLOSED CASE REMOVABLE EXPANSION CARD HAVING INTERCONNECT AND ADAPTER CIRCUITRY FOR BOTH I/O AND REMOVEABLE MEMORY.

Figure 3:
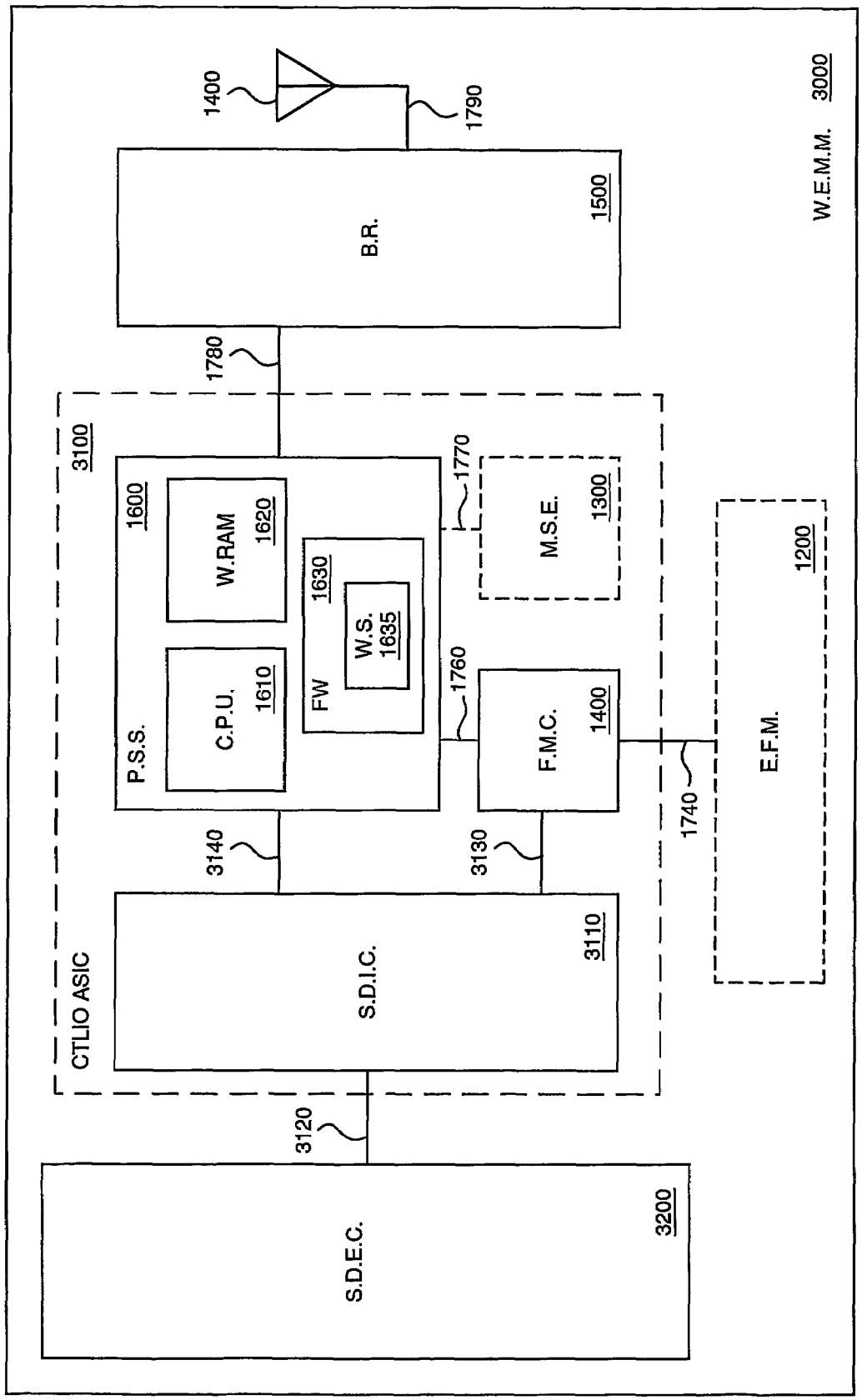
FIG. 3 is a block diagram of a WED 3000, physically and electrically compatible with the Secure Digital expansion module standard, and in accordance with the present invention.

Table 3 identifies and expands the abbreviations used in FIG. 3.

TABLE 3

| Associated ID No. | Abbreviation(s) | Expanded Name |
| --- | --- | --- |
| 1200 | E.F.M. | Embedded Flash Memory |
| 1300 | M.S.E. | Media Scaling Engine |
| 1400 | F.M.C. | Flash Memory Controller |
| 1500 | B.R. | Bluetooth Radio |
| 1600 | P.S.S. | Processor Sub-System |
| 1610 | C.P.U. | Processor |
| 1620 | W.RAM | Working RAM |

TABLE 3-continued

| Associated ID No. | Abbreviation(s) | Expanded Name |
|---|---|---|
| 1630 | FW | Firmware |
| 1635 | W.S. | Web Server |
| 3000 | W.E.M.M. | Wireless Enabled Memory Module |
| 3100 | CNTLIO | Control & I/O ASIC |
| 3110 | S.D.I.C. | Secure Digital Interface Controller |
| 3200 | S.D.E.C. | Secure Digital expansion connector |

An alternative embodiment is shown in FIG. 3, a block diagram of a WEMM 3000 according to the invention as implemented in an SD form factor. A custom ASIC 3100, as shown, could be optionally implemented, including e.g., the microprocessor 1600, memory interface 3110, media scaling engine 1300 and memory controller 1400 all on one chip.

In an illustrative embodiment, the WEMM 3000 processing capability includes the ability to rescale the media objects, including JPEG images and MP3 audio stored in the modules memory on the fly. This allows the WAP/Web interface to provide thumbnail images and highly compressed audio versions of the contents of the WEMM 3000 and to rescale media objects, including photos and audio recordings, to an appropriate size and quality for transmission over the wireless network.

Media objects (images and audio) are sent as an email message either via the phone's built in email capability or using an embedded SMTP/PPP stack over the phone's IP network connection (e.g. GPRS). In another embodiment, the images may be sent as an MMS message.

Figure 4B:
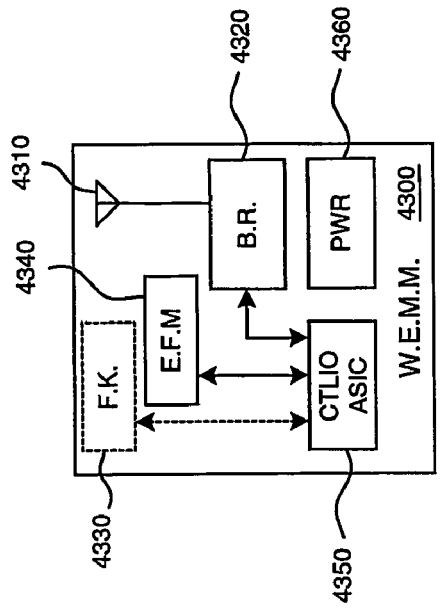
FIGS. 4A and 4B depict further illustrative embodiments or the present invention, 4000 and 4300 respectively, in which power is supplied to the WEMM either from a customer Portable Server or from an onboard Power Source.
Figure 4A:
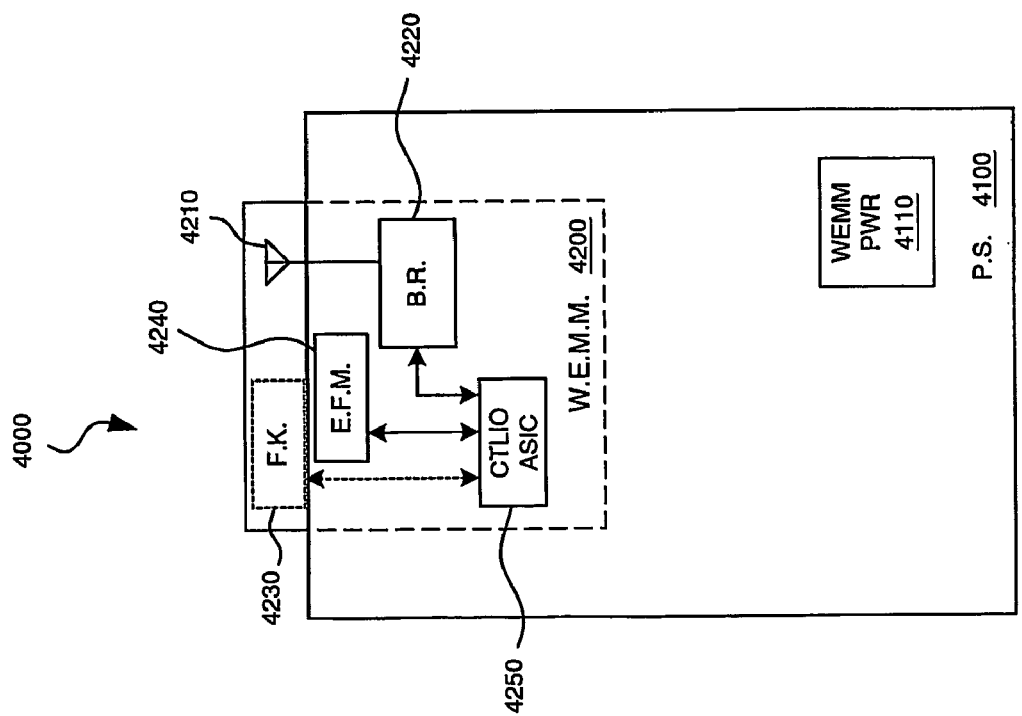

Two alternative embodiments, illustrated in FIGS. 4A and 4B, show how a WEMM (4200 in FIG. 4A, 4300 in FIG. 4B) can be used separately from the host device, when the host device does not require access to the memory. FIG. 4A shows an embodiment of a combination 4000 in which a special "holder" 4100 containing a power source 4110 is used in place of the full-function host, acting as a portable storage server and providing power to the WEMM 4200. Alternatively, FIG. 4B illustrates an embodiment in which a WEMM 4300 itself incorporates a power source 4360.

Table 4 identifies and expands the abbreviations used in FIGS. 4A and 4B.

TABLE 4

| Associated ID No. | Abbreviation(s) | Expanded Name |
|---|---|---|
| 4000 | (none) | (none) |
| 4100 | P.S. | Portable Server |
| 4110 | WEMM PWR | Wireless Enabled Memory Module Power Source |
| 4200 | W.E.M.M. | Wireless Enabled Memory Module |
| 4220 | B.R. | Bluetooth Radio |
| 4230 | F.K. | F-key(s) |
| 4240 | E.F.M. | Embedded Flash Memory |
| 4250 | CTLIO | Control & I/O ASIC |
| 4300 | W.E.M.M. | Wireless Enabled Memory Module |
| 4320 | B.R. | Bluetooth Radio |
| 4330 | F.K. | F-key(s) |
| 4340 | E.F.M. | Embedded Flash Memory |
| 4350 | CTLIO | Control & I/O ASIC |
| 4360 | PWR | Power Source |

FIGS. 4A and 4B also illustrate that the WEMM has at least one Function-key (F-key, i.e. a button with an associated configurable function). The F-key(s) are identified as 4230 in FIG. 4A and as 4330 in FIG. 4B. Example key functions include (a) e-mailing the last-taken photo to a pre-configured address, and (b) transferring the last-taken photo to the mobile phone in preparation for manual addressing and sending.

Conclusion

Although the present invention has been described using particular illustrative embodiments, it will be understood that many variations in construction, arrangement and use are possible consistent with the teachings and within the scope of the invention. Functionally equivalent techniques known to those skilled in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

All such variations in design comprise insubstantial changes over the teachings conveyed by the illustrative embodiments. The names given to interconnect and logic are illustrative, and should not be construed as limiting the invention. It is also understood that the invention has broad applicability to other applications, and is not limited to the particular application or industry of the illustrated embodiments. The present invention is thus to be construed as including all possible modifications and variations encompassed within the scope of the appended claims.

What is claimed is:

1. A removable module for coupling to a digital host and a wireless network, the coupling to the host being via an expansion port of the host, the wireless network having at least one remote wireless device, the module comprising:
    a host-to-module interface including host-to-module interconnect enabled to removably couple with the host and a host-to-module interface controller coupled to the host-to-module interconnect;
    wireless transceiver circuitry adapted to couple with the wireless network;
    a memory controller coupled to the host-to-module interface controller;
    an embedded non-volatile memory coupled to the memory controller;
    a control sub-system coupled to the wireless transceiver circuitry and the memory controller, the control sub-system being adapted to at least in part control data transfers between the memory and the wireless network without requiring any action by the host; and
    wherein the host-to-module interface controller, the wireless transceiver circuitry, the memory controller, the embedded non-volatile memory, and the control sub-system are contained in a shared housing.

2. The removable module of claim 1, wherein the host-to-module interconnect and the host-to-module interface controller are implemented in accordance with the CompactFlash standard.

3. The removable module of claim 1, wherein the host-to-module interconnect and the host-to-module interface controller are implemented in accordance with the Secure Digital (SD) standard.

4. The removable module of claim 1, wherein the host-to-module interface controller, the memory controller, and the control sub-system are all on a single ASIC.

5. The removable module of claim 1, further including media scaling circuitry.

6. The removable module of claim 5, wherein the media scaling circuitry selectively produces a version of a requested portion of the embedded non-volatile memory content that is scaled to a selected one of a plurality of available scaling factors.

7. The removable module of claim 6, wherein the plurality of scaling factors includes a thumbnail scaling factor.

8. The removable module of claim 6, wherein the plurality of scaling factors includes at least a small and a large scaling factor.

9. The removable module of claim 1, wherein the wireless transceiver circuitry is implemented in accordance with the BlueTooth standard.

10. The removable memory of claim 1, wherein the module is adapted to provide at least a first type of memory access that enables the at least one remote wireless device to access the memory without requiring any action by the host.

11. The removable memory of claim 10, wherein the module is further adapted to provide at least a second type of memory access that enables the host to access the memory without requiring any action by the control sub-system.

12. The removable memory of claim 11, wherein the module is adapted to provide the first and second types of memory access without requiring any adaptation of the host beyond compatibility between the expansion port an the host-to-module interface.

13. The removable memory of claim 1, wherein at least some of the data transfers from the memory to the wireless network are directed by the at least one remote wireless device.

14. The removable memory of claim 1, wherein the expansion port is a host expansion slot for receiving a removable module, the shared housing is adapted in at least two dimensions to fit within the host expansion slot, and the module is adapted to operate while at least partly inside the host.

15. The removable memory of claim 1, wherein the expansion port is a host expansion slot for receiving a removable module, the shared housing is adapted to fit within the host expansion slot, and the module is adapted to operate while inside the host.

16. A removable module for operative coupling to a digital host, a removable memory, and a wireless network, the coupling to the host being via an expansion port of the host, the wireless network having at least one remote wireless device, the module comprising:
  a host-to-module interface including host-to-module interconnect enabled to removably couple with the host and a host-to-module interface controller coupled to the host-to-module interconnect;
  wireless transceiver circuitry adapted to couple with the wireless network;
  a removable memory controller coupled to the host-to-module interface controller;
  a slot for receiving and coupling the removable memory to the removable memory controller;
  a control sub-system coupled to the wireless transceiver circuitry and the removable memory controller, the control sub-system being adapted to at least in part control data transfers between the memory and the wireless network without requiring any action by the host; and
  wherein the host-to-module interface controller, the wireless transceiver circuitry, the removable memory controller, and the control sub-system are contained in a shared housing.

17. The removable module of claim 16, wherein the host-to-module interconnect and the host-to-module interface controller are implemented in accordance with the CompactFlash standard.

18. The removable module of claim 16, wherein the host-to-module interconnect and the host-to-module interface controller are implemented in accordance with the Secure Digital (SD) standard.

19. The removable module of claim 16, wherein the host-to-module interface controller, the removable memory controller, and the control sub-system are all on a single ASIC.

20. The removable module of claim 16, further including media scaling circuitry.

21. The removable module of claim 20, wherein the media scaling circuitry selectively produces a version of a requested portion of the removable memory content that is scaled to a selected one of a plurality of available scaling factors.

22. The removable module of claim 21, wherein the plurality of scaling factors includes a thumbnail scaling factor.

23. The removable module of claim 21, wherein the plurality of scaling factors includes at least a small and a large scaling factor.

24. The removable module of claim 16, wherein the wireless transceiver circuitry is implemented in accordance with the BlueTooth standard.

25. The removable memory of claim 16, wherein the module is adapted to provide at least a first type of memory access that enables the at least one remote wireless device to access the memory without requiring any action by the host.

26. The removable memory of claim 25, wherein the module is further adapted to provide at least a second type of memory access that enables the host to access the memory without requiring any action by the control sub-system.

27. The removable memory of claim 26, wherein the module is adapted to provide the first and second types of memory access without requiring any adaptation of the host beyond compatibility between the expansion port an the host-to-module interface.

28. The removable memory of claim 16, wherein at least some of the data transfers from the memory to the wireless network are directed by the at least one remote wireless device.

29. The removable memory of claim 16, wherein the expansion port is a host expansion slot for receiving a removable module, the shared housing is adapted in at least two dimensions to fit within the host expansion slot, and the module is adapted to operate while at least partly inside the host.

30. The removable memory of claim 16, wherein the expansion port is a host expansion slot for receiving a removable module, the shared housing is adapted to fit within the host expansion slot, and the module is adapted to operate while inside the host.

31. A method of transferring data, the method comprising:
  coupling a wireless-enabled removable module to an expansion port of a host;
  coupling a non-volatile memory to the removable module;
  transferring data of a first type between the host and the non-volatile memory;
  communicating with the removable module over a first wireless network from a remote wireless-enabled device;
  through a user interface of the remote device, directing a control sub-system of the removable module;

under the control of the control sub-system as directed by the remote device, transferring data of a second type between the remote device and the non-volatile memory; and wherein the communicating, the directing, and the transferring data of the second type are performed using browser-server transactions between a browser on the remote device and a web server executing in the control sub-system, and without requiring any action by the host.

32. The method of claim 31, wherein the host is a digital camera.

33. The removable memory of claim 31, wherein the data of the first type is transferred without requiring any action by the control sub-system for the web server.

* * * * *